(12) United States Patent
Cofer et al.

(10) Patent No.: US 6,841,780 B2
(45) Date of Patent: Jan. 11, 2005

(54) METHOD AND APPARATUS FOR DETECTING OBJECTS

(75) Inventors: Darren D. Cofer, Minnetonka, MN (US); Rida M. Hamza, Minneapolis, MN (US); Marek Gierczak, Meylan Cedex (FR)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 10/052,953

(22) Filed: Jan. 17, 2002

(65) Prior Publication Data

US 2002/0125435 A1 Sep. 12, 2002

Related U.S. Application Data

(60) Provisional application No. 60/262,925, filed on Jan. 19, 2001.

(51) Int. Cl.$^7$ .................................................. G01J 5/02
(52) U.S. Cl. .................... 250/341.1; 382/103; 348/143; 348/152
(58) Field of Search .......................... 250/341.1, 341.8; 382/107, 103; 348/143, 152

(56) References Cited

U.S. PATENT DOCUMENTS

| | | | |
|---|---|---|---|
| 4,923,066 A | 5/1990 | Ophir et al. | |
| D347,442 S | 5/1994 | Falconer | |
| D349,713 S | 8/1994 | Hasegawa | |
| D349,714 S | 8/1994 | Hasegawa | |
| D349,911 S | 8/1994 | Shimizu et al. | |
| D349,913 S | 8/1994 | Morris | |
| 5,359,363 A | 10/1994 | Kuban et al. | |
| D354,973 S | 1/1995 | Hisatune et al. | |
| 5,402,168 A | 3/1995 | Fouilloy | |
| 5,418,567 A | 5/1995 | Boers et al. | |
| 5,436,462 A | * | 7/1995 | Hull-Allen .................. 250/550 |
| 5,448,320 A | | 9/1995 | Sakai et al. |
| 5,477,212 A | | 12/1995 | Rumpel |
| D365,834 S | | 1/1996 | Dozier |
| 5,539,199 A | * | 7/1996 | Ruckh et al. ............ 250/222.1 |
| 5,573,006 A | | 11/1996 | Shimotani et al. |
| D378,095 S | | 2/1997 | Hasegawa |
| 5,613,013 A | * | 3/1997 | Schuette ..................... 382/124 |

(List continued on next page.)

FOREIGN PATENT DOCUMENTS

| | | |
|---|---|---|
| DE | 19809210 | 9/1999 |
| EP | 0631430 A2 | 6/1994 |
| EP | 0610863 A1 | 8/1994 |
| EP | 0654684 A2 | 5/1995 |
| EP | 0468839 B1 | 9/1995 |
| EP | 0691632 A1 | 1/1996 |
| EP | 0491121 B1 | 2/1996 |
| EP | 0519379 B1 | 9/1996 |
| EP | 0554197 B1 | 10/1996 |
| EP | 0484076 B1 | 12/1996 |

(List continued on next page.)

OTHER PUBLICATIONS

Tran, Lee, Zhang, Lo, "Ultrafine Motion Detection of Micromechanical Structures Using Optical Moire Patterns," IEEE Photonics Technology Letter, vol. 8, No. 8, pp. 1058–1060, Aug. 1996.

(List continued on next page.)

Primary Examiner—Christopher W. Fulton
Assistant Examiner—Madeline Gonzalez
(74) Attorney, Agent, or Firm—Kris T. Fredrick

(57) ABSTRACT

An object detection system is provided that projects one or more patterns onto a monitored area, captures one or more live images of the monitored area, and detects objects that enter the monitored area by detecting changes in the one or more patterns in the live images. Such an object detection system may be less susceptible to dynamic lighting conditions, and more sensitive to object motion and/or presence.

26 Claims, 12 Drawing Sheets

U.S. PATENT DOCUMENTS

| | | | |
|---|---|---|---|
| 5,627,616 A | | 5/1997 | Sergeant et al. |
| 5,649,255 A | | 7/1997 | Schieltz |
| 5,657,076 A | * | 8/1997 | Tapp ........................... 348/154 |
| 5,677,535 A | | 10/1997 | Stephan |
| 5,691,765 A | | 11/1997 | Schieltz et al. |
| 5,731,832 A | | 3/1998 | Ng |
| 5,745,170 A | | 4/1998 | Palmer |
| 5,752,100 A | | 5/1998 | Schrock |
| 5,790,910 A | | 8/1998 | Haskin |
| 5,793,900 A | | 8/1998 | Nourbakhsh et al. |
| 5,795,306 A | | 8/1998 | Shimotani et al. |
| 5,801,770 A | | 9/1998 | Paff et al. |
| D399,517 S | | 10/1998 | Hasegawa |
| 5,818,519 A | | 10/1998 | Wren |
| 5,835,218 A | * | 11/1998 | Harding ................. 250/237 G |
| 5,835,613 A | | 11/1998 | Breed et al. |
| 5,845,000 A | | 12/1998 | Breed et al. |
| 5,852,754 A | | 12/1998 | Schneider |
| 5,870,135 A | | 2/1999 | Glatt et al. |
| 5,878,156 A | | 3/1999 | Okumura |
| 5,953,055 A | | 9/1999 | Huang et al. |
| 5,980,123 A | * | 11/1999 | Heifler ....................... 396/427 |
| 6,035,067 A | | 3/2000 | Ponticos |
| 6,286,349 B1 | * | 9/2001 | Muller et al. ................ 72/11.7 |
| 6,392,754 B1 | * | 5/2002 | Pingel et al. ............... 356/603 |
| 6,456,320 B2 | * | 9/2002 | Kuwano et al. ............ 348/143 |
| 6,456,384 B1 | * | 9/2002 | Kulawiec et al. ........... 356/618 |
| 6,496,253 B1 | * | 12/2002 | Vokhmin ..................... 356/124 |
| 6,509,967 B1 | * | 1/2003 | Pingel et al. ............ 356/239.1 |
| 6,564,166 B1 | * | 5/2003 | Ume et al. .................. 702/136 |

FOREIGN PATENT DOCUMENTS

| | | |
|---|---|---|
| EP | 0529317 B1 | 12/1996 |
| EP | 0772169 A2 | 5/1997 |
| EP | 0774730 A2 | 5/1997 |
| EP | 0800152 A1 | 10/1997 |
| EP | 0810791 A2 | 12/1997 |
| EP | 0585033 B1 | 1/1998 |
| EP | 0575220 B1 | 3/1998 |
| EP | 0632858 B1 | 8/1998 |
| EP | 0691632 B1 | 10/1998 |
| EP | 1168269 A2 | 1/2002 |
| JP | 07056219 | 8/1993 |
| JP | 07104362 | 10/1993 |
| JP | 07159892 | 12/1993 |
| JP | 07175128 | 12/1993 |
| JP | 07191390 | 12/1993 |
| JP | 07222039 | 1/1994 |
| JP | 07255004 | 3/1994 |
| JP | 07281276 | 4/1994 |
| JP | 08076213 | 9/1994 |
| JP | 08140941 | 11/1994 |
| JP | 09083999 | 9/1995 |
| JP | 09193078 | 1/1996 |
| JP | 10031256 | 7/1996 |
| JP | 10042231 | 7/1996 |
| WO | WO 84/03784 | 9/1984 |
| WO | WO 97/01246 | 1/1997 |
| WO | WO 97/05741 | 2/1997 |
| WO | WO 97/05744 | 2/1997 |
| WO | WO 97/12278 | 4/1997 |
| WO | WO 98/18026 | 4/1998 |
| WO | WO 98/46116 | 10/1998 |
| WO | WO 98/47025 | 10/1998 |
| WO | WO 98/47117 | 10/1998 |

OTHER PUBLICATIONS

Chang–Hua Hu and Yu–Wen Qin, "Digital color encoding and its application to the moire technique," Applied Optics, vol. 36, No. 16, pp. 3682–3685, Jun. 1, 1997.

Krumm, et al., "Sampled–grating and crossed–grating models of moirépatterns from digital imaging", Optical Engineering, vol. 30, No. 2, pp. 195–206, Feb. 1991.

Voloshin and Tsao, "Effect of Geometry on the Strain in Electronic Packages," Proceedings Microelectronics Education For the Future, Ninth Biennial University/Government/Industry Microelectronics Symposium, pp. 246–251, Melbourne, Florida, Jun. 12–14, 1991.

Kunihiko Mori, et al., "Fringe pattern analysis using hybrid image processing", Applied Optics, vol. 29, No. 11, pp. 1646–1817, Apr. 10, 1990.

Qifeng Yu, et al., "Digital pure shear–strain moirépatterns", Applied Optics, vol. 31, No. 11, pp. 1813–1817, Apr. 10, 1992.

Setiawan Hadi, "Circular Moire Patterns In 3D Vision Applications", A Thesis Submitted In Partial Fulfillment of the Requirements for the Degree of Master of Computer Science in the Faculty of Computer Science, The University of New Brunswick, May 1996.

Xiangdong Liu, "Analysis and Reduction of Moire Patterns in Scanned Halftone Pictures", Dissertation submitted to the faculty of Virginia Polytechnic Institute and State University, Blacksburg, Virginia, May 1996.

M.Vertregt, et al., "FA 7.4 A 0.4W Mixed–Signal Digital Storage Oscilloscope Processor with Moire Prevention, Embedded 393kb RAM and 50MSample/s 8b ADC", IEEE International Solid–State Circuits Conference, pp. 114–115, 1998.

A.M. Loske, et al., "Two–dimensional spatial correlator for lens–free image processing", Optik, 103, No. 2, pp. 59–65, 1996.

R.Rodriquez–Vera, "Three–dimensional gauging by electronic moirécontouring", Revista Mexicana de Fisica 40, No. 3, pp. 447–458, 1994.

M.R. Sajan, et al., "TDI imaging and scanning moiré for online defect detection", Optics & Laser Technology, vol. 29, No. 6, pp. 327–331, 1997.

A.J. Moran et al., "Automatic digitization and analysis of moiré topograms on a personal computer for clinical use", Med. Eng. Phys., vol. 16, pp. 259–264, May 1994.

Y. Morimoto et al., "Strain analysis by mismatch moiré method and grid method using Fourier transform", Computational Mechanics (1990) 6, pp. 1–10.

William M. Rosenblum et al., "Computerized Moire Analysis of Progressive Addition Lenses", Optometery and Vision Science, vol. 69, No. 12, pp. 936–940, 1992.

Yu Qifeng et al., "A New Method For Constructing Digital–Strain–Field–Images From Moire Patterns", Chinese Journal of Aeronautics, vol. 3, No. 1, pp. 16–22, Feb. 1990.

M. Batouche, "A Knowledge Based System for diagnosing spinal deformations: Moire Pattern Analysks and Interpretation", 11th IAPR International Conference on Pattern Recognition, pp. 591–594, The Hague, The Netherlands, Aug. 30–Sep. 3, 1992.

A. Asundi et al., "Digital moiré for measurements on cylindrical objects", J. Opt. 29 (1998), pp. 128–134.

J. Fang, "Optical modulation and digital demodulation of an in–plane moiré carrier", Optics & Laser Technology, vol. 23, No. 6, pp. 349–352, 1991.

J. Campos et al., "Moire Interferometry With Pseudo–Random Screens", SPIE vol. 1983 Optics as a Key to High Technology, pp. 724–725, (1993).

Tu Jinhong et al., "Temperature Mapping by Double Grating diffraction System with Microcomputer Image Process", SPIE vol. 1230 International Conference on Optoelectronic Science and Engineering '90, pp. 196–198.

Rong–Seng Chang et al., "Analysis of CCD moiré pattern with the wavelet transform", Part of the SPIE Conference on Wavelet Applications VI, Orlando, Florida, Apr. 1999, pp. 420–428, SPIE vol. 3723 0277–786X/99.

M. Bruynooghe et al., "Fast algorithms for automatic moiré fringe analysis. Application to non–contact measurements for quality control of industrial components", SPIE vol. 2786, 0–8194–2172–3/96, pp. 54–67.

Harry S. Gallarda et al., "3–D Gradient and Curvature Measurement Using Local Image Information", SPIE vol. 1194 Optics, Illumination, and Image Sensing for Machine Vision IV (1989), pp. 198–208.

Angela Jianu et al., "Talbot–moire deflectometry with direct spatial reconstruction of optical phase", SPIE vol. 3405 0277–786X/98, pp. 517–521.

Lori L. Barski et al., "Characterization, detection and suppression of stationary grids in digital projection radiography imagery", Part of the SPIE Conference on Image Display, San Diego, California, Feb. 1999, SPIE vol. 3658 0277–786X/99.

Asundi, et al., "Digital Moire applications in Automated Inspection", SPIE vol. 2347, pp. 270–275, 0–8194–1682–7/94.

Blanco et al., "Study of Plate Vibrations by Moire Holography", SPIE Vo. 1508, Industrial Applications of Holographic and Speckle measuring Technioques, pp. 180–190, 1991.

Gazzero et al., "Restoration of Images Transmitted Through Coherent Fiber Bundles", SPIE vol. 12332, Medical Imaging IV: Image Capture and Display, pp. 20–25, 1990.

Bruynooghe, et al., "Real–time digital/optical system for quality control by moiré image processing", SPIE vol. 3208, pp. 445–454, 0277–786X/97.

Rastogi et al., "Parallel Image Processing Software on Anupam", Computer Division, BARC, Trombay, Bombay–400085, pp. 173–178.

Nakamura et al., High Quality Image Processing Method using Moire Suppression and Edge Enhancement Filtering, pp. 445–450.

The Japan Machinery Federation, "Development for the International Standards in the field of Safety Machinery—A vision–based protective device (VBPD)," *The Japanese National Committee for IEC/TC44*, 36 pages, Oct. 1, 2001.

Aach, T., et al., "Statistical Model–Based Change Detection in Moving Video," Signal Processing, vol. 31, No. 2, pp. 165–180, Mar. 1993.

Weszka, J.S., "Survey: A Survey of Threshold Selection Techniques," Computer Graphics and Image Processing 7, vol. 7, No. 2, pp. 259–265, Apr. 1978.

Ostermann, J., "Modeling of 3D Moving Objects For An Analysis–Synthesis Coder," SPIE–SPSE: Symposium on Sensing and Reconstruction of 3D Objects and Scenes, Proc. SPIE 1260, pp. 240–249, Santa Clara, CA., Feb. 1990.

Xiong, W., et al., "Efficient Scene Change Detection and Camera Motion Annotation, for Video Classification," Computer Vision and Image Understanding, vol. 71, No. 2, pp. 166–181, Aug. 1998.

Skifstad, K., et al., "Illumination Independent Change Detection for Real World Image Sequences," Computer Vision, Graphics, and Image Processing, vol., 46, No. 3, pp. 387–399, Jun. 1989.

Vekatsheh, S., "Dynamic Threshold Determination by Local and Global Edge Evaluation," Graphical Models and Image Processing, vol. 57, No. 2, pp. 146–160, Mar. 1995.

Ostermann, J., "Segmentation of Image Areas Changed Due to Object Motion Considering Shadows," Multimedia Communications and Video Coding, pp. 241–246, Y. Wang, Ed., New York: Plenum, 1996.

Stauder, J., Segmentation of Moving Objects in Presence of Moving Shadows: Proc. Int. Workshop on Coding Techniques for Very Low Bit Rate Video, Linkoping, Sweden, Jul. 28–30, 1997, pp. 41–44.

Hotter, M., et al., "Image Segmentation Based on Object Oriented Mapping Parameter Estimation", Signal Processing, vol. 15, No. 3, pp. 315–334, Oct. 1988.

U.S. patent application Ser. No. 09/716,002, filed Nov. 17, 2000, entitled, "Object Detection."

U.S. Provisional patent application Ser. No. 60/275,879, filed Mar. 14, 2001, entitled, "Safety Camera."

Maki M.C, et al., "New Options an Using Infrared for Detection, Assessment and Surveillance", Security Technology, 1996, 30th Annual 1996 International Carnahan Conference, Lexington, KY, Oct. 2–4, 1996, New York, NY, IEEE Oct. 2, 1996, pp. 12–18.

International Electrotechnical Commission (IEC); "Development for the International Standards in the field of Safety of Machinery—A vision–based protective device (VBPD)"; Oct. 01, 2001; The Japanese National Commission for IEC/TC44.

* cited by examiner

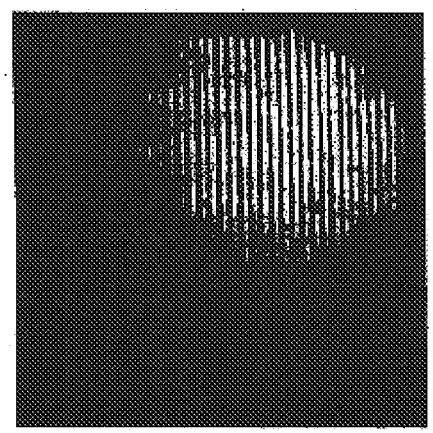
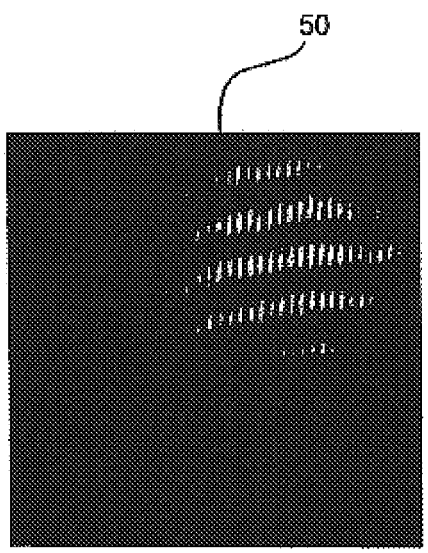
*FIG. 5A*  *FIG. 5B*

METHOD AND APPARATUS FOR DETECTING OBJECTS

This application claims priority under 35 U.S.C. §119(e)(1) to co-pending U.S. Provisional Patent Application Ser. No. 60/262,925, filed Jan. 19, 2001, and entitled "OBJECT DETECTION USING MOIRÉ INTERFERENCE".

FIELD OF THE INVENTION

The present invention relates to object detection, and more specifically, to object intrusion and/or presence detection within a monitored area or region.

BACKGROUND OF THE INVENTION

Motion detection and object detection systems are well known in the art. Frequently, such systems monitor a user-defined area to detect when an object enters or passes through a monitored area. Such systems typically include an image capture device (typically a video camera or still camera) capable of capturing an image of the monitored area and, if required, a device for digitizing the captured images. The digitized images are analyzed in an attempt to detect whether an object has entered the monitored area. There are many different known methods and algorithms for analyzing digitized images for determining when an object has entered a monitored area. One of the most common methods is generally referred to as a change detection method.

Change detection is often accomplished by examining the difference between a current live image and a reference image, where the reference image contains only the static background of the monitored area. A reference image can be thought of as a representation of the monitored area as it would appear if no transitory objects were in view. Change detection algorithms often take two digitized images as input and return the locations in the field of view where differences between the images are identified.

Object detection systems are commonly used in environments that have dynamic lighting conditions. For example, in industrial settings, moving shadows can be cast on a monitored area or region, which can cause significant changes in ambient lighting conditions. Many existing object detection systems, including those that use change detection algorithms to detect objects, can be challenged by such shadows and/or other dynamic lighting conditions.

SUMMARY OF THE INVENTION

The present invention overcomes many of the disadvantages of the prior art by providing an object detection system that is less susceptible to dynamic lighting conditions, and/or more sensitive to three-dimensional object motion and/or presence. This is preferably accomplished by projecting one or more static or dynamic patterns onto the monitored area, capturing one or more live images of the monitored area including the one or more patterns, and detecting objects in the monitored area by detecting changes in the one or more patterns in selected captured images.

In a first illustrative embodiment of the present invention, a single pattern is projected onto the monitored area. One or more live images of the monitored area are then captured at selected times, and analyzed to detect changes in the projected pattern. The changes in the pattern may indicate a topographical change in the monitored area, and thus the entry or movement of an object in the monitored area. Because the pattern is projected onto the monitored area, changes in the ambient lighting conditions may have less effect on the efficacy of the object detection system.

In another illustrative embodiment, a moiré interference pattern is used to help detect objects in the monitored area. Moiré interference patterns are particularly sensitive to relative motion between the two or more underlying patterns that are used to create the moiré interference pattern. As such, the use of moiré interference patterns can be highly effective in detecting objects that intrude into a monitored area.

A moiré interference pattern may be created in any number of ways. For example, two or more similar patterns may be projected onto the monitored area from offset illumination positions. Alternatively, or in addition, one pattern may be projected onto the monitored area, while another may be imposed by a patterned grating positioned in the image plane of the image capture device. Yet another way of creating a moiré interference pattern is to capture two images of the same area having a single projected pattern, and digitally or optically rotating or otherwise changing the position of one of the images relative to the other to create a moiré interference pattern. Any number of other methods may also be used to create a moiré interference pattern, as desired.

When using a moiré interference pattern, one or more live images of the monitored may be captured at selected times. The images may then be analyzed to detect changes in the moiré interference pattern. Changes in the moiré interference pattern may indicate a topographical change in the monitored area and thus the entry or movement of an object in the monitored area. An advantage of using moiré interference patterns is that shadows and/or other changes in ambient lighting conditions may have little or no effect on the position, frequency or other characteristics of the moiré interference pattern. To help prevent the projected pattern from being overwhelmed by ambient light, it is contemplated that a portion of the spectrum or lighting frequency that is not typically found in the ambient lighting conditions may be used to project the one or more patterns on the monitored area, such as near infrared.

The present invention may be used to monitor a user-defined safety zone for the intrusion of people or other objects. However, numerous other applications are also contemplated including security, recording, and other monitoring and/or detection applications.

BRIEF DESCRIPTION OF DRAWINGS

FIGS. 5A–5C depict an example of moiré interference phenomena in accordance with the present invention;

DETAILED DESCRIPTION OF THE INVENTION

Figures 1A, 1B:
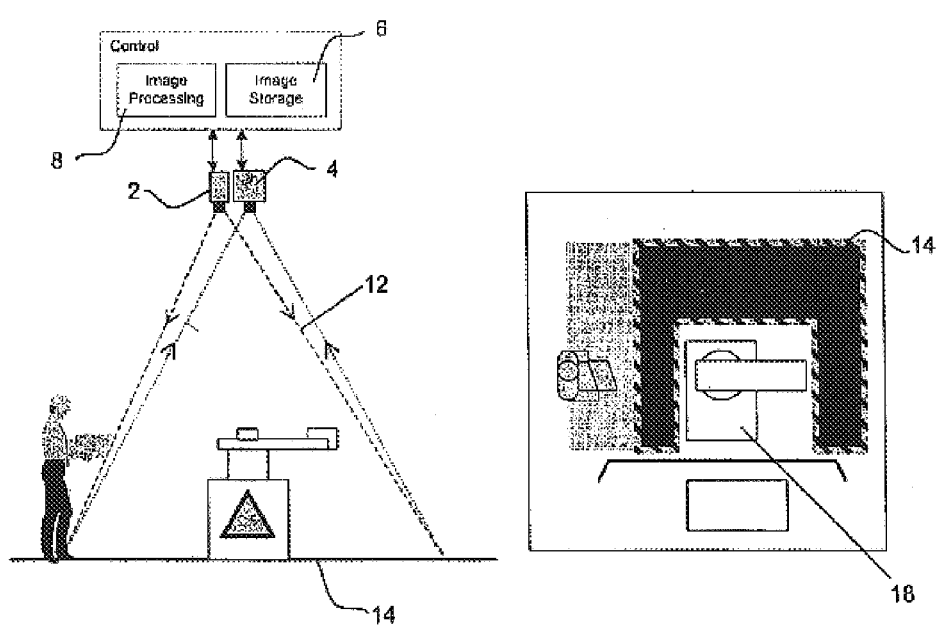
FIGS. 1A–1B are schematic diagrams showing one illustrative object detection system in accordance with the present invention.

The following description should be read with reference to the drawings wherein like reference numerals indicate like elements throughout the several drawings. The detailed description and drawings represent select illustrative embodiments and are not intended to be limiting.

The present invention provides an object detection system that may be less susceptible to dynamic lighting conditions, and/or may be more sensitive to object motion and/or presence than prior art systems. The system is also sensitive to all three-dimensional extraneous objects that intrude into the monitored area. This may be accomplished by, for example, projecting one or more static or dynamic patterns on the monitored area, capturing one or more images of the monitored area including the one or more patterns, and detecting objects in the monitored area by detecting changes in the one or more patterns in selected captured images.

FIGS. 1A–1B are schematic diagrams showing a first illustrative object detection system in accordance with the present invention. The illustrative object detection system of FIG. 1A includes an illumination source 2, an image capture device 4, an image storage device 6, and a processing device 8. In some embodiments, the illumination source 2, image capture device 4, image storage device 6, and processing device 8 are integrated into a common device, while in other embodiments, separate devices are provided, as desired.

The illumination source 2 is located above a monitored area 14, such as near a ceiling. The illumination source 2 illuminates the monitored area 14 with a desired pattern. The pattern may be generated by, for example, projecting through a patterned grating, projecting interference patterns where the interference fringes are formed by a phasor or wavelength shifting, projecting a pattern using a scanning mechanism, or any other suitable method.

As noted above, the pattern may be static or dynamic. A dynamic pattern is one where the spatial position of the light areas and dark areas is moving, and in general the movement is periodic in nature. One way to realize a dynamic moiré pattern is to project an interference pattern from a Mach-Zender interferometer, which may include a mirror on a peso-actuator. The frequency of movement of the mirror may determine the frequency of interference fringe movement. It is contemplated that the monitored area 14 may be rectangular, round, or any other shape, as desired. As shown in FIG. 1B, the illustrative monitored area 14 extends around three side of a machine 18.

It is contemplated that the illumination source 2 may be any type of illumination source capable of projecting a desired pattern on the monitored area 14. Examples of suitable illumination sources 2 include an incandescent or fluorescent lamp with a patterned mask and illumination optics. Other examples of suitable illumination sources 2 include a lasing source such as a modulated light-stripe illumination module, or a laser diode source uniformly illuminating a patterned grating with the grating re-imaged onto the monitored area with an objective projection lens. Yet another example of a suitable illumination source 2 may be an infrared source. Using a portion of the spectrum not ordinarily found in the ambient lighting conditions, such as the near infrared, may help keep the projected pattern from being overwhelmed by the ambient lighting conditions, and may also help enhance the differentiation between the projected pattern and other sources of light in the environment. In addition, or alternatively, the image capture device may be a sensor (CCD or the like) that is attuned to a desired spectrum, such as the spectrum of the illumination source.

The illumination source 2 preferably projects at least one pattern on the monitored area 14. The pattern used may depend on the particular application at hand. For example, in one illustrative embodiment, the pattern may be any pattern that has transitions between areas that have illumination (e.g. light areas) and areas that lack illumination (e.g. dark areas). Generally, the average distance between transitions should be approximately the same size as the smallest object for which detection is desired, although this is not required. Examples of suitable patterns included striped or checker board patterns where illuminated and non-illuminated areas alternate. Some illustrative patterns are shown in FIGS. 3A–3B and FIGS. 4A–4B, but any suitable pattern may be used.

Once illuminated, and in one illustrative embodiment, the image capture device 4 captures a reference image of the monitored area 14. The reference image is preferably an image of the monitored area 14 with no transitory objects in the monitored area 14. The reference image is preferably stored, at least temporarily, in the image storage device 6. A new reference image may be captured periodically, if desired. Once a reference image is captured, the image capture device 4 may capture successive live images of the monitored area 14, preferably at a selected time interval. Like the reference image, the live images are preferably stored, at least temporarily, in the image storage device 6. The image storage device 6 may provide the reference image and the live images to the processing device 8 for processing.

The processing device 8 preferably analyzes the live images to detect changes in the illuminated pattern. In some embodiments, the monitored area is divided into a number of image segments called mask windows. The size of each mask window is preferably chosen so that it is no bigger than the approximate size of the smallest object for which detection is desired. While objects smaller than the mask window may be detected, the probability of detecting such objects decreases with object size. The position of the various mask windows may be chosen so that the entire area to be monitored is covered by overlapping mask windows. The image area that corresponds to each mask window may be analyzed separately for object detection, if desired. In addition, it is contemplated that the analysis method that is used to analyze the various mask windows may differ across the image, and the triggered response may vary depending on which mask window detects an object, if desired.

The comparison between a reference image and a live image can be accomplished in any number of ways. One method is to simply do a pixel-by-pixel comparison of the images, such as by subtracting one image from the other. If there is no entry or movement of objects in the monitored area, the projected pattern in the two images will substantially cancel out. However, if there is entry or movement of an object in the monitored area, part of the projected pattern shown in one image may be shifted or otherwise deformed relative to the pattern shown in the other image. A threshold value may be used to help determine if there is a sufficient difference between the reference image and a live image to indicate a detected object, as further described below.

Another method for comparing one image to another is to calculate a difference "gref" between the value of the brightness levels corresponding to the light areas of the pattern (such as in a mask window), and the value of the brightness levels corresponding to the dark areas in the mask window of the reference image. A similar calculation may be made for the mask windows of a live image. Whenever the second calculation is different from the first calculation by a specified amount, a change may be inferred. A further discussion of this and other methods for comparing images is included in co-pending U.S. patent application Ser. No. 09/716,002, entitled "Object Detection", which is incorporated herein by reference.

Yet another method for comparing one image to another is to measure a correlation between each pixel and some neighboring pixels and/or a correlation between selected features, and then compare the correlation values. Whenever the correlation values are different by a specified amount, a change may be inferred. Alternatively, or in addition, the image analysis may extract the moiré spatial frequency and phase using a Fourier transform. Other image analysis techniques may also be used including, for example, unsharp masking, thresholding, contrast segmentation, filtering processing, skeletonization processing, multi-resolution analysis, deformable contour modeling, image clustering, morphology, etc. These comparison methods are meant to be only illustrative, and that any suitable method may be used to compare the images or selected characteristics of the images, depending on the application.

It is also contemplated that the reference and/or live images may be preprocessed before they are compared. For example, the reference image and/or live images may be provided to a filter that helps removes speckle, provides smoothing, changes overall intensity, or otherwise cleans-up the images.

Changes that are detected in the illuminated pattern may indicate a topographical change within the monitored area 14, and thus entry or movement of an object in the monitored area 14. When an object is detected, the processing device 8 may sound an alarm, shut down the machine 18, and/or provide some other alarm or action. Images of the monitored area with the detected object present may be retained for subsequent analysis, and/or sent to a monitoring station if desired.

Figure 2A:
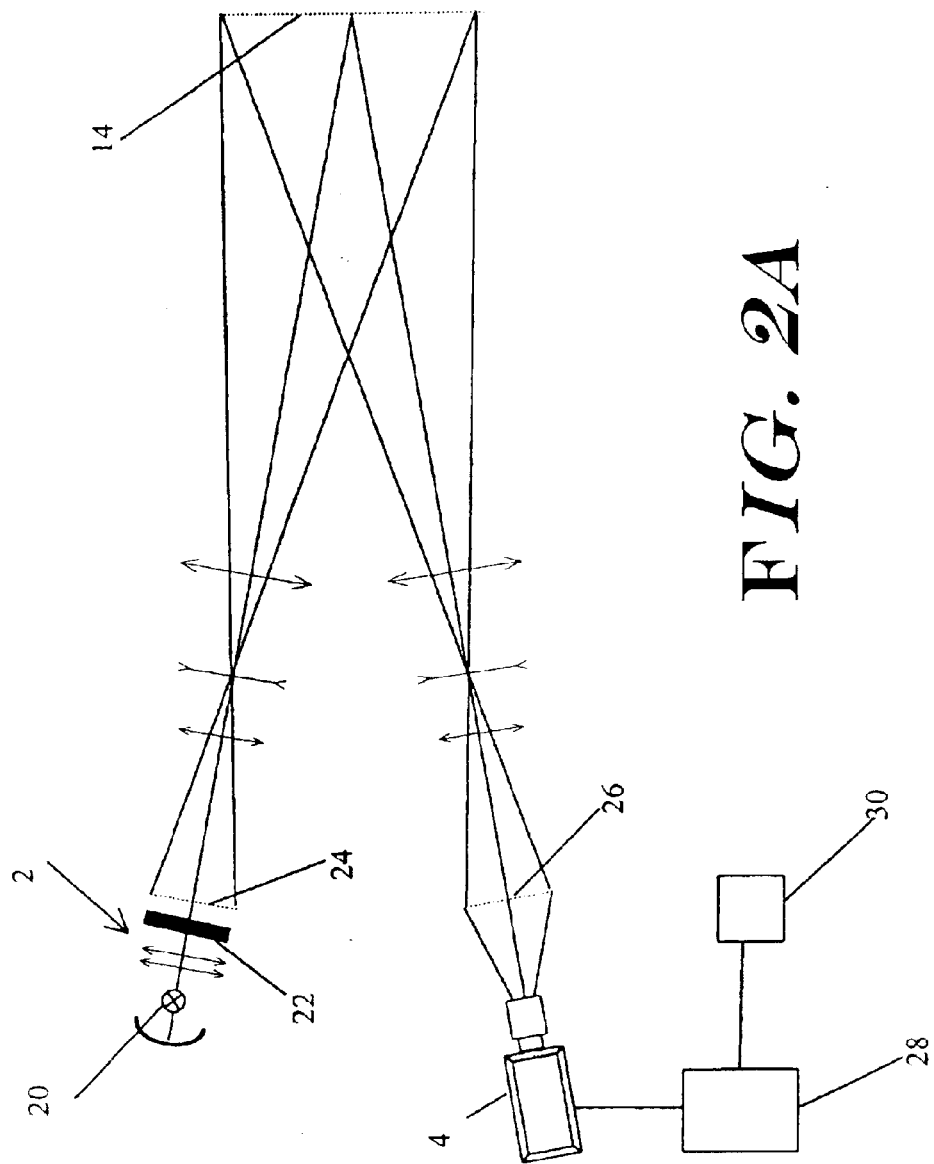
FIGS. 2A–2B are schematic diagrams showing other illustrative object detection systems in accordance with the present invention.
Figure 2B:
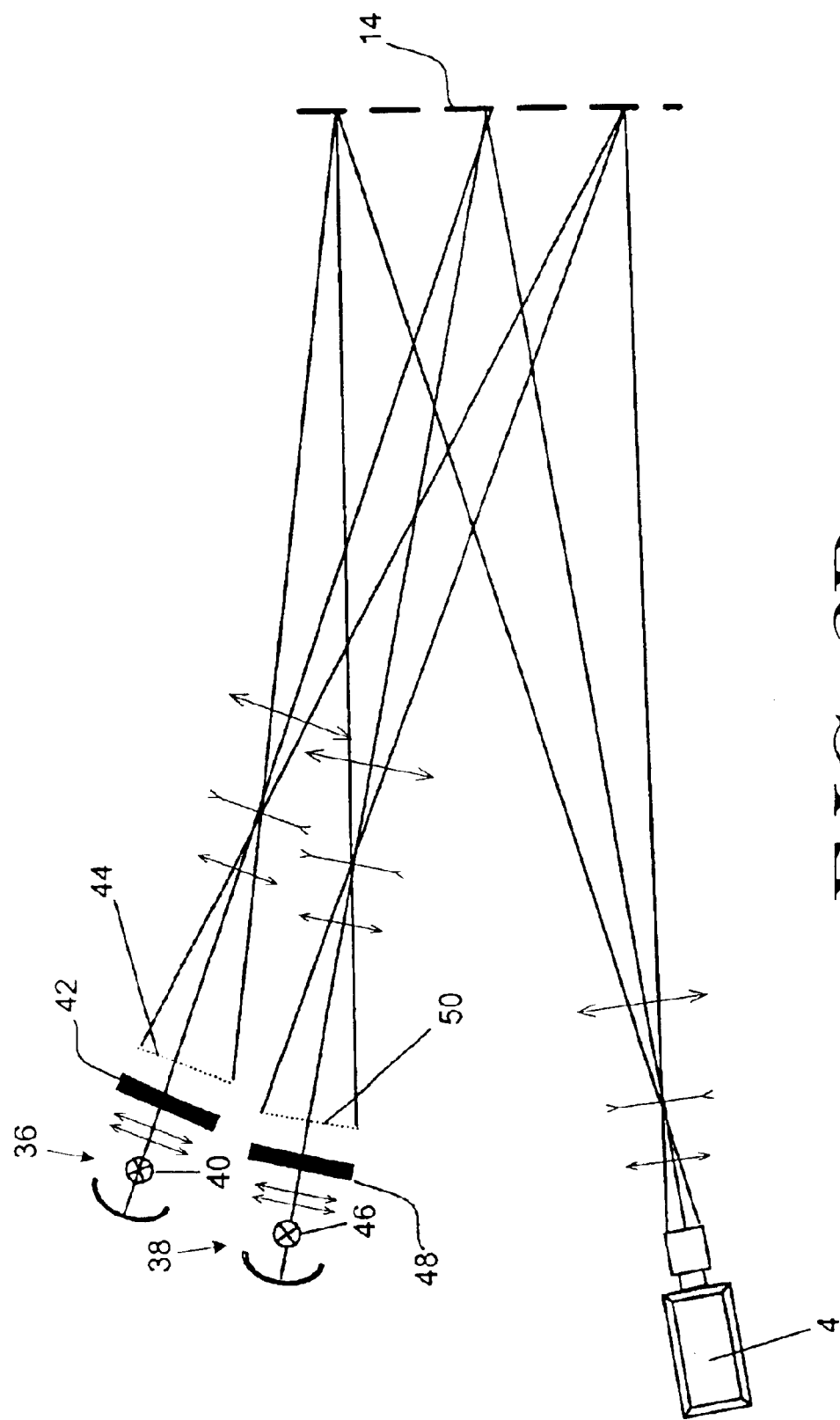
Figure 3A:
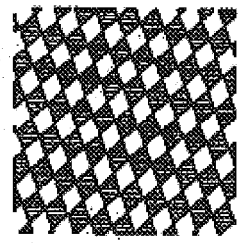
FIGS. 3A–3B depict two example patterns that can be used in accordance with some embodiments of the present invention.
Figure 3B:
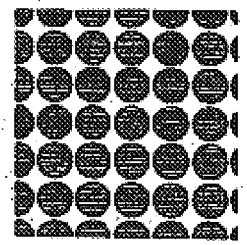
Figure 4A:
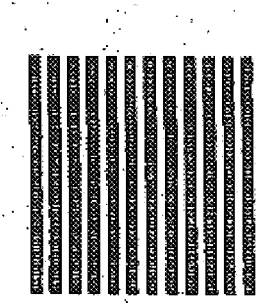
FIGS. 4A–4B depict two examples of patterns that can be used in accordance with other embodiments of the present invention.
Figure 4B:
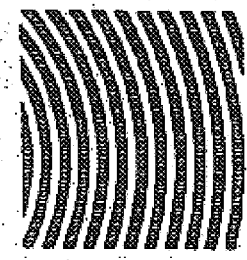

FIGS. 2A–2B are schematic diagrams showing yet other illustrative object detection systems in accordance with the present invention. In FIG. 2A, the illumination source 2 includes a radiation source 20, an objective projection lens 22, and a patterned grating 24. In the illustrative embodiment, the patterned grating 24 provides the desired pattern on the monitored area 14. It is contemplated that any pattern suitable for creating a moiré interference pattern may be used. Some suitable patterns are shown in FIGS. 4A–4B. Rather than providing a separate patterned grating, the illumination source 2 itself may be configured to provide the desired pattern, if desired.

In the illustrative embodiment shown in FIG. 2A, the image capture device 4 captures a first image of the monitored area 14 through a second grating 26. The second grating 26 may be any type of grating, filter or mask that produces the desired pattern. In some cases, the second grating 26 may be provided by the CCD pixel array of the image capture device 4 itself. The first grating 24 and the second grating 26 preferably collectively produce a live image that including a moiré interference pattern therein. In some embodiments, the second pattern may be imposed digitally on the live image after the live image has been captured, if desired. The image capture device 4 transmits the live image to an image storage device 28, which in the embodiment shown, may also include a processing device.

The position of the illumination source 2 and the image capture device 4 are preferably spaced from each other by a distance. This distance can be small to large. This space may help encourage a change in the pattern that reaches the image capture device 4 when a topographical change occurs in the monitored area 14. Typically, the space should be larger as the resolution of the projected pattern is increased. Finally, a warning device 30 may be attached to the image storage device 28, and may be activated upon detection of an object.

In FIG. 2B, two illumination sources 36 and 38 are provided for projecting two separate patterns on the monitored area 14. Illumination source 36 includes a radiation source 40, an objective projection lens 42, and a patterned grating 44. The illumination source 36 preferably projects a first pattern on the monitored area 14. Likewise, illumination source 38 includes a radiation source 46, an objective projection lens 48, and a patterned grating 50. Illumination source 38 preferably projects a second pattern on the monitored area 14. The first pattern and the second pattern preferably collectively cause a moiré interference pattern to be formed on the monitored area 14.

Image capture device 4 is used to capture a live image of the monitored area 14. Like above, the image capture device 4 may include an image storage device and a processing device. The live images are preferably analyzed to detect changes in the moiré interference pattern over time. Changes in the moiré interference pattern may indicate a topographical change in the monitored area 14 and thus the entry or movement of an object in the monitored area 14.

The illustrative embodiments shown in FIGS. 2A–2B both cause a moiré interference pattern to be provided in the resulting live image. It is contemplated that the image analysis may be similar to that discussed above with respect to FIGS. 1A–1B. Alternatively, or in addition, the image analysis may extract the moiré spatial frequency and phase using a Fourier transform. Other image analysis techniques may also be used including, for example, unsharp masking, thresholding, contrast segmentation, filtering processing, skeletonization processing, multi-resolution analysis, deformable contour modeling, image clustering, morphology, etc. Alternatively, or in addition, a radon filter may be oriented perpendicular to the moiré interference bands, and any loss of correlation between the filtered results from the reference image and the live image may indicate a change in the moiré interference bands.

Figure 5C:
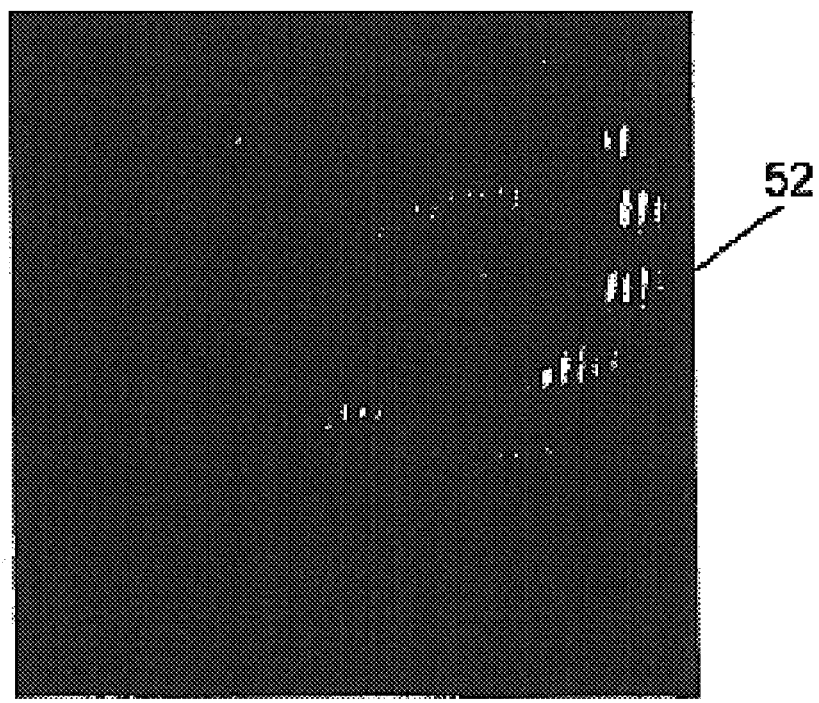

FIGS. 5A–5C depict an example of moiré interference phenomena in accordance with the present invention. FIG. 5A shows an image of a first pattern projected onto a monitored area. The first pattern includes a number of parallel lines extending in the vertical direction. FIG. 5B shows an image of the monitored area with a second pattern superimposed on the first pattern. The second pattern includes a number of parallel lines extending in a direction that is radially offset relative to the vertical direction. In the illustrative embodiment shown, the surface of the monitored area is spherical in shape, resulting in a number of curved moiré interference bands 50. FIG. 5C shows an image of the monitored area with an object 52 positioned in the monitored area. The object 52 causes a change in the moiré interference bands relative to FIG. 5B. As indicated above, the moiré interference bands are highly sensitive to topographical changes in the monitored area, which in the embodiment shown, is illustrated by the introduction of the three-dimensional object 52 into the monitored area.

Figure 6A:
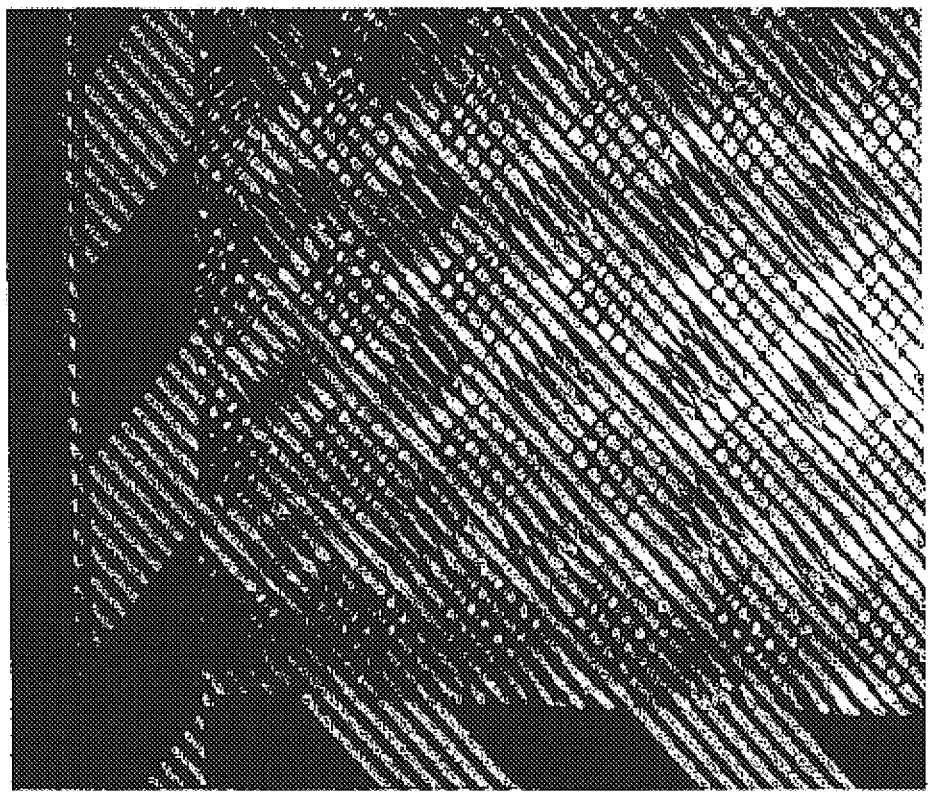
FIGS. 6A–6C depict an illustrative reference image, live image and comparison image, respectively, in accordance with one embodiment of the present invention.
Figure 6B:
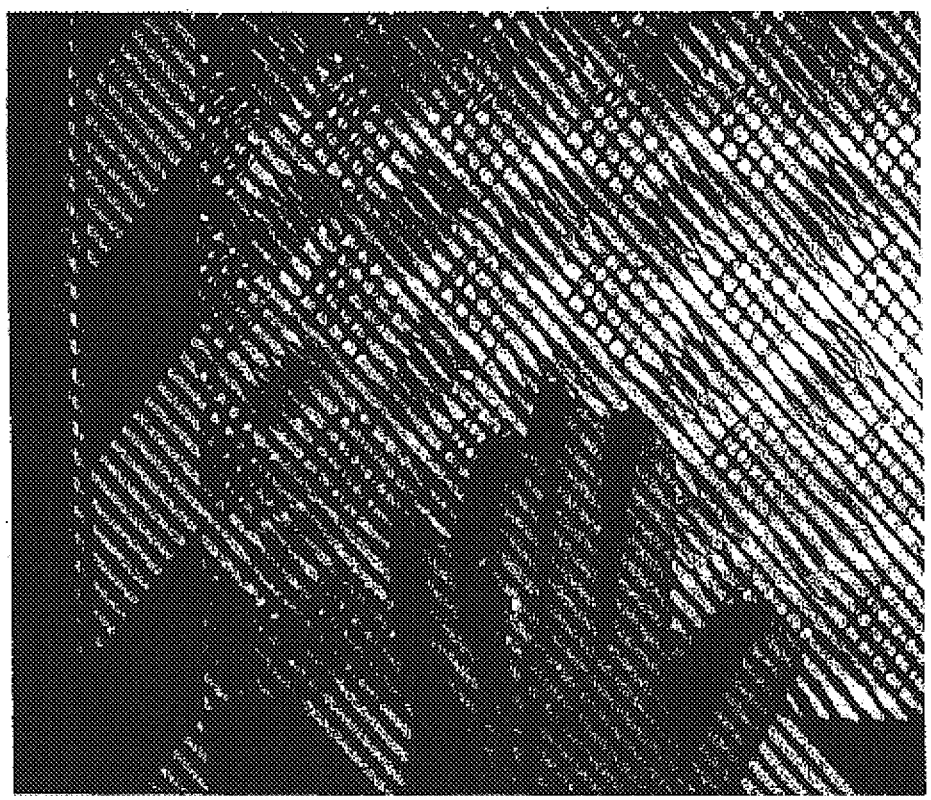
Figure 6C:
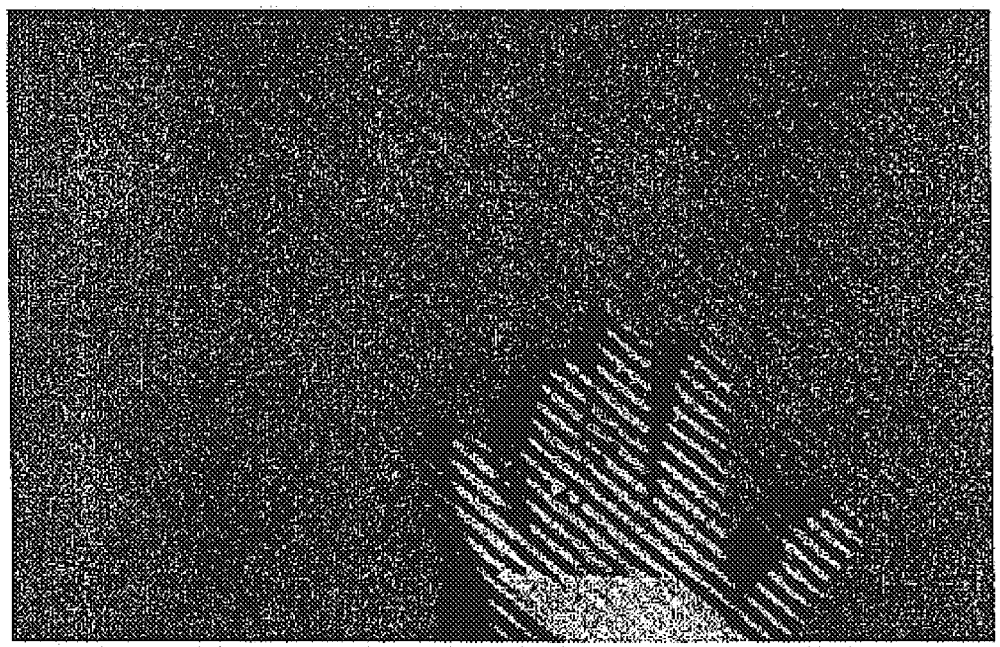

FIGS. 6A–6C depict an illustrative reference image, live image and comparison image, respectively, where only a single pattern is projected onto the monitored area and no grating is positioned between the monitored area and the image capture device. The image shown in FIG. 6A is a reference image of the monitored area. The image shown in FIG. 6B is an image of the monitored area when a hand is placed in the monitored area. The image shown in FIG. 6C is an image that results from the comparison (e.g. subtraction) of the image shown in FIG. 6A and the image shown in FIG. 6B. As can be seen, the image shown in FIG. 6C highlights the object, including its boundary, within the monitored area. In addition, virtual interference bands appear in and around the object. Under some circumstances, it may be desirable to provide a tolerance or threshold below which differences are likely due only to normal variations in lighting conditions or between images taken of the same area at different times. This tolerance may reduce the likelihood of false positives, and increase the reliability of the system.

Figure 7:
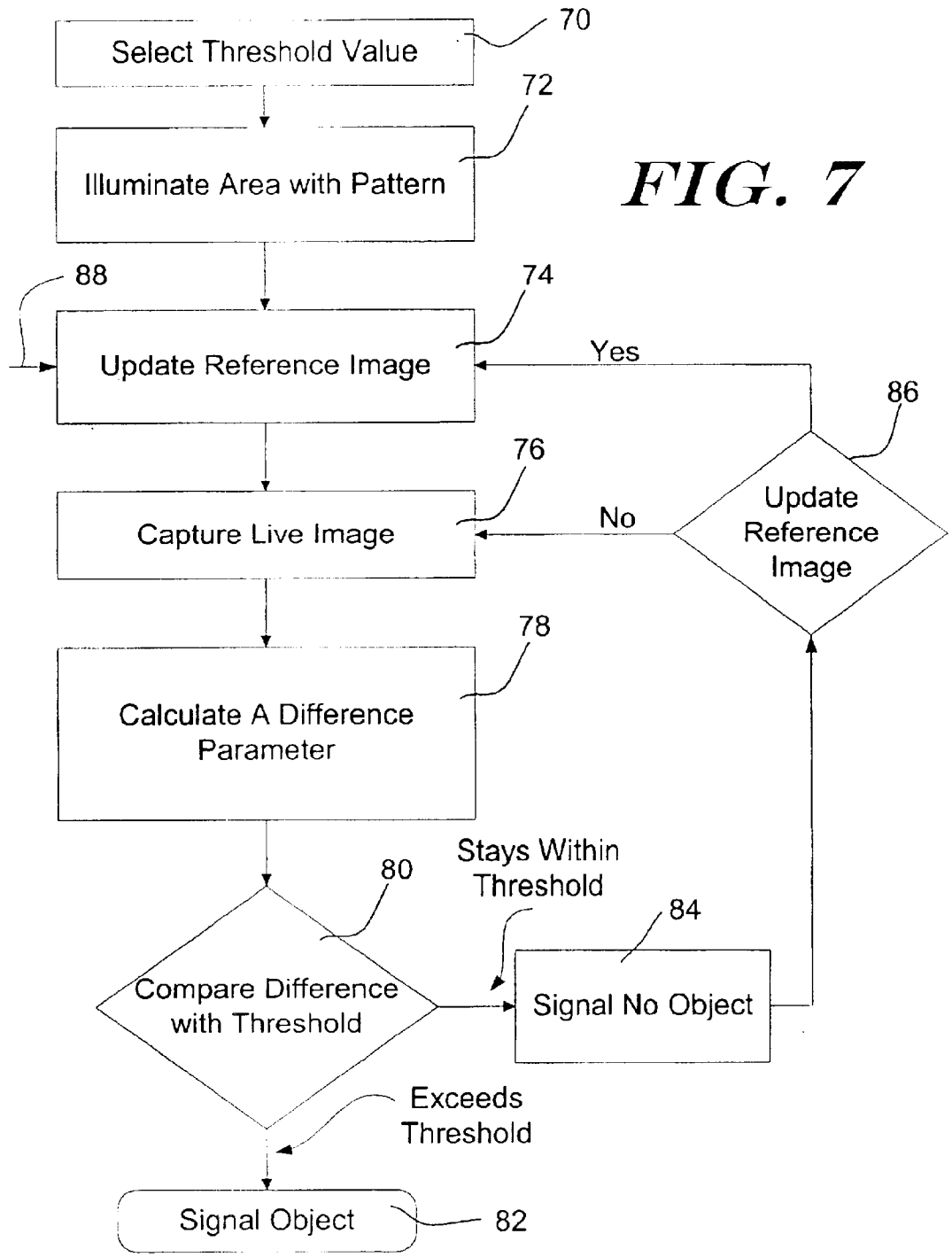
FIG. 7 is a flow diagram showing an illustrative method in accordance with present invention.

FIG. 7 is a flow diagram showing an illustrative method in accordance with present invention. The illustrative method is entered at step 70, wherein a threshold value is selected. Control is then passed to step 72. Step 72 illuminates a monitored area with a pattern. As described above, the pattern may be any suitable pattern. Step 74 then captures a reference image of the monitored area. The reference image preferably contains only the static background of the monitored area, with no transitory objects present. In some embodiments, the reference image can be captured/updated upon manual initiation, as shown at 88.

Step 76 then captures a live image of the monitored area. Step 78 compares the reference image and the live image to determine a difference parameter. As detailed above, the comparison of the reference image and the live image can be accomplished in any number of ways. One method is to simply do a pixel-by-pixel comparison of the images, such as by subtracting one image from the other. If there is no entry or movement of objects in the monitored area, the projected pattern in the two images will substantially cancel out. However, if there is entry or movement of an object in the monitored area, part of the projected pattern shown in one image may be shifted or otherwise deformed relative to the pattern shown in the other image.

Another method is to calculate a difference "gref" between the value of the brightness levels corresponding to the light areas of the pattern (such as in a mask window), and the value of the brightness levels corresponding to the dark areas in the mask window of the reference image. A similar calculation may be made for the mask windows of the live image. Yet another method is to measure a correlation between each pixel and some neighboring pixels and/or a correlation between selected features, and then compare the correlation values. Other illustrative methods include extracting the moiré spatial frequency and phase using a Fourier transform, unsharp masking, thresholding, contrast segmentation, filtering processing, skeletonization processing, multi-resolution analysis, deformable contour modeling, image clustering, morphology, etc. These comparison methods are meant to be only illustrative, and that any suitable method may be used to compare the images or selected characteristics of the images, depending on the application.

It is also contemplated that the reference and/or live images may be preprocessed before they are compared. For example, the reference image and/or live images may be provided to a filter that helps removes speckle, provides smoothing, changes overall intensity, or otherwise cleans-up the images.

Step 80 determines if the differences identified in step 78 exceed the threshold value specified in step 70. If the differences exceed the threshold value, control is passed to step 82. Step 82 signals that an object is present in the monitored area. In some embodiments, an action is then taken, such as sounding an alarm, shutting down a machine, and/or providing some other alarm or action. If the differences do not exceed the threshold value, control is passed to step 84. Step 84 signals that an object is not present in the monitored area, and control is passed to step 86.

Step 86 determines if an updated reference image is desirable. Under some circumstances, such as when the lighting conditions are dynamic in or around the monitored area, it may be advantageous to periodically update the reference image. If it is determined that an updated reference image is desirable, control is passed to step 74. Step 74 updates the reference image with the previous live image. Alternatively, a new reference image may be captured, if desired, so long as no objects have entered the monitored area. If it is determined that an updated reference image is not needed, control is passed to step 76, wherein a new live image is captured.

Figure 8:
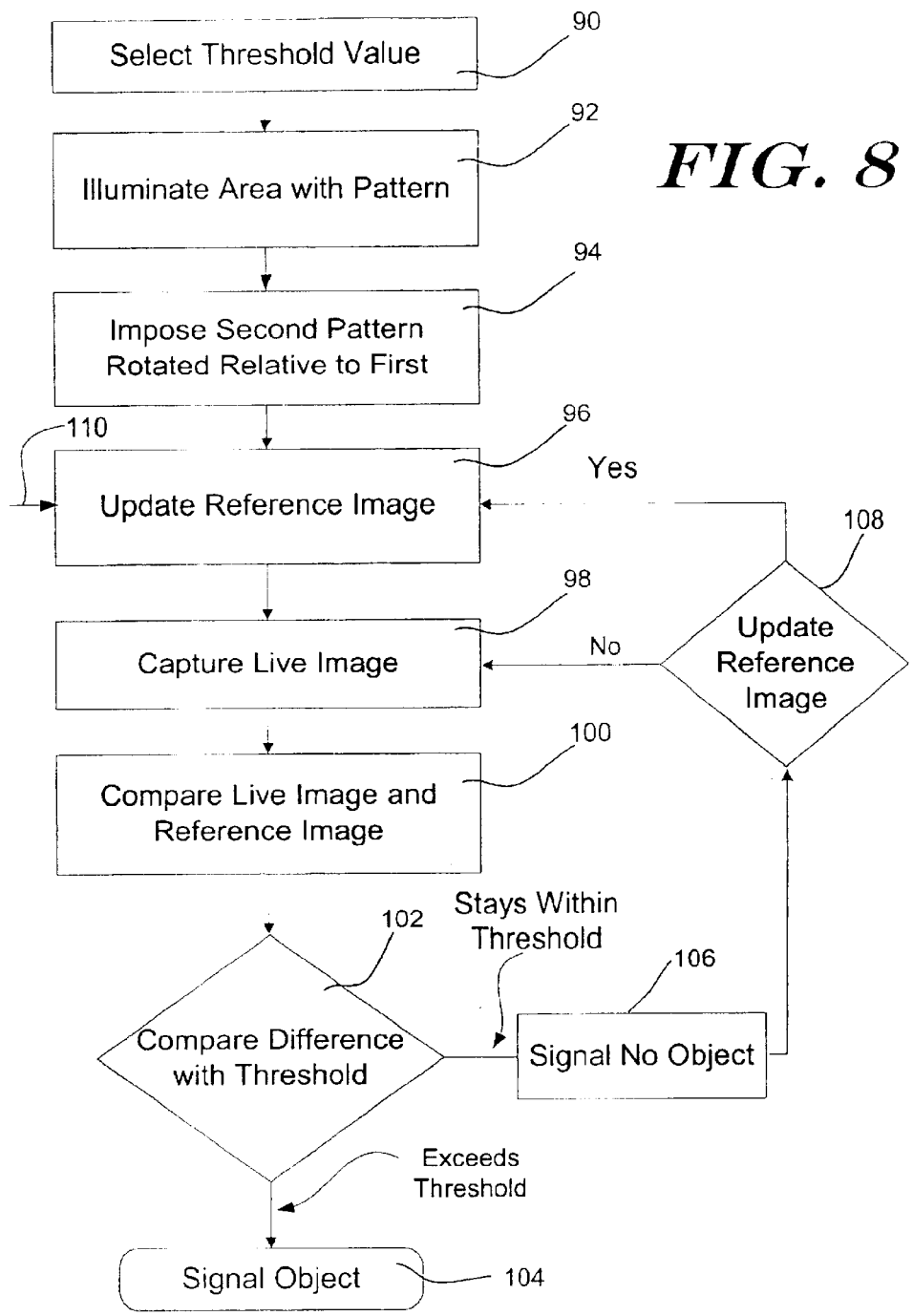
FIG. 8 is a flow diagram showing another illustrative method in accordance with the present invention.

FIG. 8 is a flow diagram showing another illustrative method in accordance with the present invention. The illustrative method is entered at step 90, wherein a threshold value is selected. Control is then passed to step 92. Step 92 illuminates a monitored area with a first pattern. Control is then passed to step 94. Step 94 imposes a second pattern relative to the first pattern. Step 94 may, for example, illuminate the monitored area with the second pattern, or a grating may be placed between the monitored area and an image capture device, as desired.

Step 96 then captures a reference image of the monitored area. The reference image preferably contains only the static background of the monitored area, with no transitory objects present. In some embodiments, the reference image can be captured/updated upon manual initiation, as shown at 110.

Step 98 captures a live image of the monitored area. Step 100 compares the reference image and the live image to determine selected differences. Step 102 determines if the differences identified in step 100 exceed the threshold value specified in step 90. If the differences exceed the threshold value, control is passed to step 104. Step 104 signals that an object is present in the monitored area. In some embodiments, an action is then taken, such as sounding an alarm, shutting down a machine, and/or providing some other alarm or action. If the differences do not exceed the threshold value, control is passed to step 106. Step 106 signals that an object is not present in the monitored area, and control is passed to step 108.

Step 108 determines if an updated reference image is desirable. Under some circumstances, such as when the lighting conditions are dynamic in or around the monitored area, it may be advantageous to periodically update the reference image. If it is determined that an updated reference image is desirable, control is passed to step 96. Step 96 updates the reference image with the previous live image. Alternatively, a new reference image may be captured, if desired, so long as no objects have entered the monitored area. If it is determined that an updated reference image is not needed, control is passed to step 98, wherein a new live image is captured.

Figure 9:
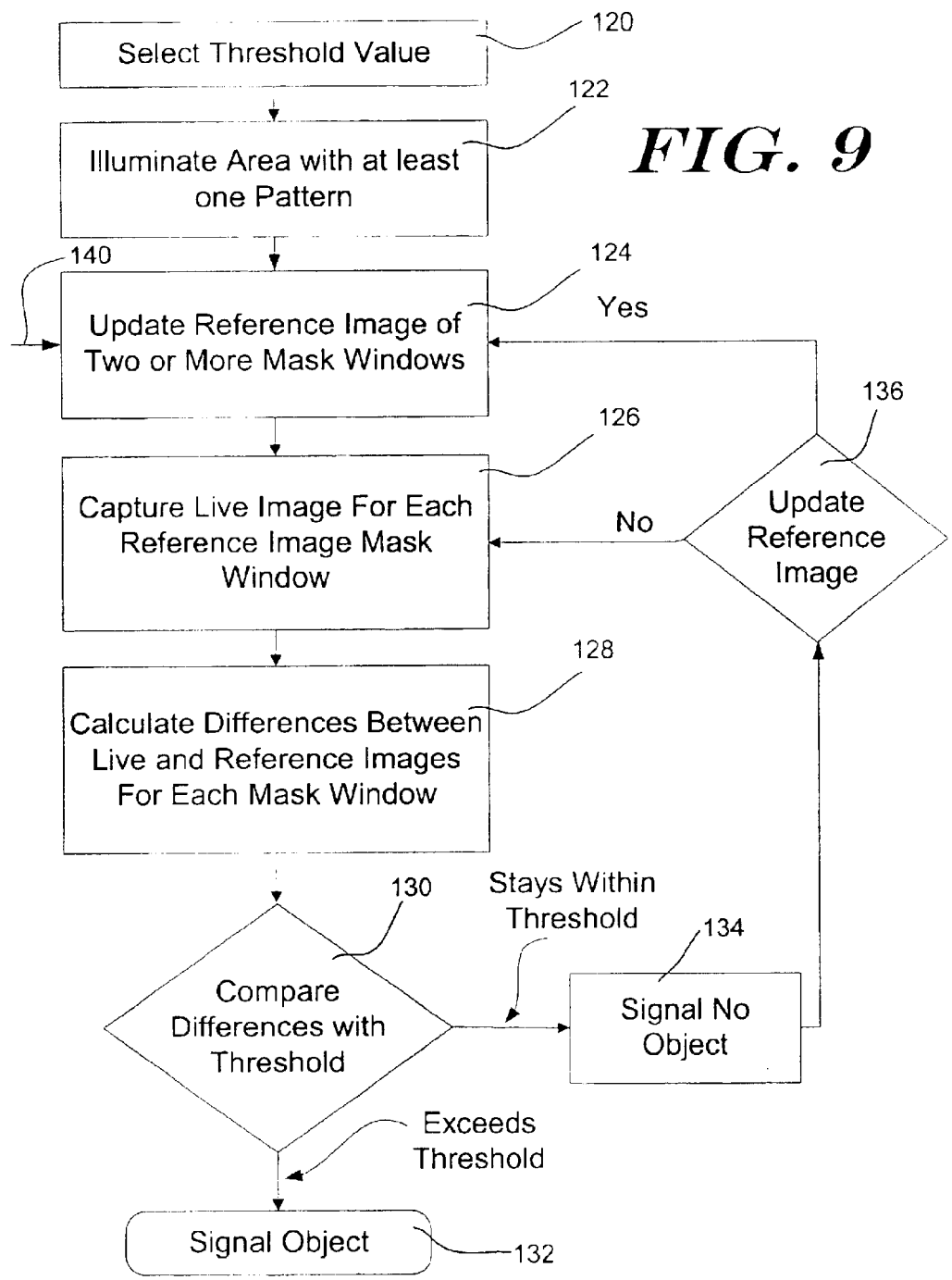
FIG. 9 is a flow diagram showing yet another illustrative method in accordance with the present invention.

FIG. 9 is a flow diagram showing yet another illustrative method in accordance with the present invention. The illustrative method is entered at step 120, wherein a threshold value is selected. Control is then passed to step 122. Step 122 illuminates a monitored area with at least one pattern. Step 124 captures a reference image of two or more mask windows of the monitored area. Each mask window preferably corresponds to a sub-area or region within the monitored area. In some embodiments, the reference image can be captured/updated upon manual initiation, as shown at 140.

Step 126 captures a live image of each mask window within the monitored area. Then, for each mask window, step 128 compares the reference image and the live image to determine differences therebetween. In some embodiments, selected mask windows of the reference image and the live image are compared using different compare algorithms. Step 130 determines if any of the differences identified in step 128 exceed the threshold value specified in step 120. In some embodiments, each mask window or group of mask windows has a different threshold value.

If any of the differences exceed the threshold value(s), control is passed to step 132. Step 132 signals that an object is present in the monitored area. In some embodiments, an action is then taken, such as sounding an alarm, shutting down a machine, and/or providing some other alarm or action. In some embodiments, the action taken may depend on which mask window detects an object. For example, for one mask window, the action may include sounding an alarm, while for another mask window the action may include shutting down a machine within the monitored area. In any event, if the differences do not exceed the threshold value(s), control is passed to step 134. Step 134 signals that an object is not present in the monitored area, and control is passed to step 136.

Step 136 determines if an updated reference image is desirable. If it is determined that an updated reference image is desirable, control is passed to step 124. Step 124 updates the reference image with the previous live image. Alternatively, a new reference image may be captured, if desired, so long as no objects have entered the monitored area. If it is determined that an updated reference image is not needed, control is passed to step 126, wherein a new live image is captured of the mask windows of the monitored area.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for detecting an object entering a monitored area, the method comprising the steps of:
   projecting a pattern onto the monitored area, the pattern defining one or more lighter regions and one or more darker regions;
   capturing a live image of the monitored area, including the pattern; and
   detecting an object entering the monitored area when a change is detected in the pattern in the live image.

2. A method according to claim 1 wherein the detecting step detects an object entering the monitored area when the change in the pattern exceeds a predetermined threshold.

3. A method according to claim 1 further comprising the steps of:
   capturing a reference image of the monitored area, including the pattern; and
   comparing the reference image and the live image to detect a change in the pattern in the live image.

4. A method according to claim 3 wherein the reference image and the live image each have a number of mask windows, and wherein the comparing step compares selected mask windows of the reference image to selected mask windows of the live image.

5. A method according to claim 4 wherein the comparing step compares the selected mask windows of the reference image and the live image using one or more comparing algorithms.

6. A method according to claim 5 wherein the comparing step compares two or more of the selected mask windows using different comparing algorithms.

7. A method according to claim 4 further comprising the step of performing a predefined action if the detecting step detects an object entering one of the selected mask windows.

8. A method according to claim 7 wherein the predefined action is different depending on in which mask window an object is detected.

9. A method according to claim 1 wherein the pattern is a static pattern.

10. A method according to claim 1 wherein the pattern is a dynamic pattern.

11. The method according to claim 1 wherein the pattern includes two or more darker regions, wherein at least selected darker regions are separated from an adjacent darker region by a lighter region.

12. The method according to claim 1 wherein the pattern includes two or more lighter regions and two or more darker regions.

13. A method for detecting an object entering a monitored area, the method comprising the steps of:
   illuminating the monitored area with a first pattern;
   creating moiré interference bands by imposing a second pattern shifted relative to the first pattern;
   capturing a live image of the monitored area, including the moiré interference bands; and
   detecting an object entering the monitored area when a change is detected in the moiré interference bands in the live image.

14. A method according to claim 13 wherein the detecting step detects an object entering the monitored area when the change in moiré the interference bands exceeds a predetermined threshold.

15. A method according to claim 13 further comprising the steps of:
   capturing a reference image of the monitored area, including the moiré interference bands; and
   comparing the reference image and the live image to detect a change in the moiré interference bands in the live image.

16. A method according to claim 15 wherein the comparing step includes subtracting at least part of the live image from at least part of the reference image or visa-versa.

17. A method according to claim 13 wherein the moiré interference bands are created by illuminating the monitored area with the second pattern.

18. A method according to claim 13 wherein the moiré interference bands are created by providing a mask or grating having the second pattern between the monitored area and an image capture device.

19. A method according to claim 13 wherein the moiré interference bands are created by digitally imposing the second pattern on the live image.

20. A method according to claim 13, wherein the reference image of the monitored area and the live image of the monitored area are captured with a sensor.

21. A method according to claim 20, wherein the first pattern is illuminated using light from a specified spectral region and the sensor is attuned to the spectral region.

22. A method according to claim 21, wherein the specified spectral region is near infrared.

23. A method according to claim 13, wherein the first pattern is illuminated using light from a first illumination source, and the second pattern is imposed using a second illumination source.

24. A method for detecting an object entering a monitored area, the method comprising the steps of:

illuminating the monitored area with a first pattern;

creating moiré interference bands by imposing a second pattern that is different relative to the first pattern;

capturing a reference image of the monitored area;

capturing a live image of the monitored area, including the moiré interference bands; and detecting an object in the monitored area when a change is detected in the moiré interference bands in the live image, and wherein the interference bands of the reference image are compared with the live image using a Radon filter oriented perpendicular relative to the interference bands.

25. A method for detecting an object in a monitored area comprising:

illuminating the monitored area with a specified pattern having bright areas and dark areas, each with a brightness level;

capturing a plurality of reference image mask windows, each mask window covering at least part of the monitored area;

for each reference image mask window, calculating a difference between the brightness levels corresponding to the light areas in the mask window and the brightness levels corresponding to the dark areas in the mask window;

for each reference image mask window, capturing a corresponding live image mask window;

for each live image mask window, calculating a difference between the brightness levels corresponding to the light areas in the mask window and the brightness levels corresponding to the dark areas in the mask window; and indicating that an object has been detected when, for any mask window, the difference calculated for the live image is different from the corresponding difference calculated for the reference image by at least a specified threshold value.

26. A method according to claim 25 wherein the illuminating step includes illuminating the monitored area with a first specified pattern and a second specified pattern to create one or more moiré interference bands.

* * * * *